Patented July 5, 1932

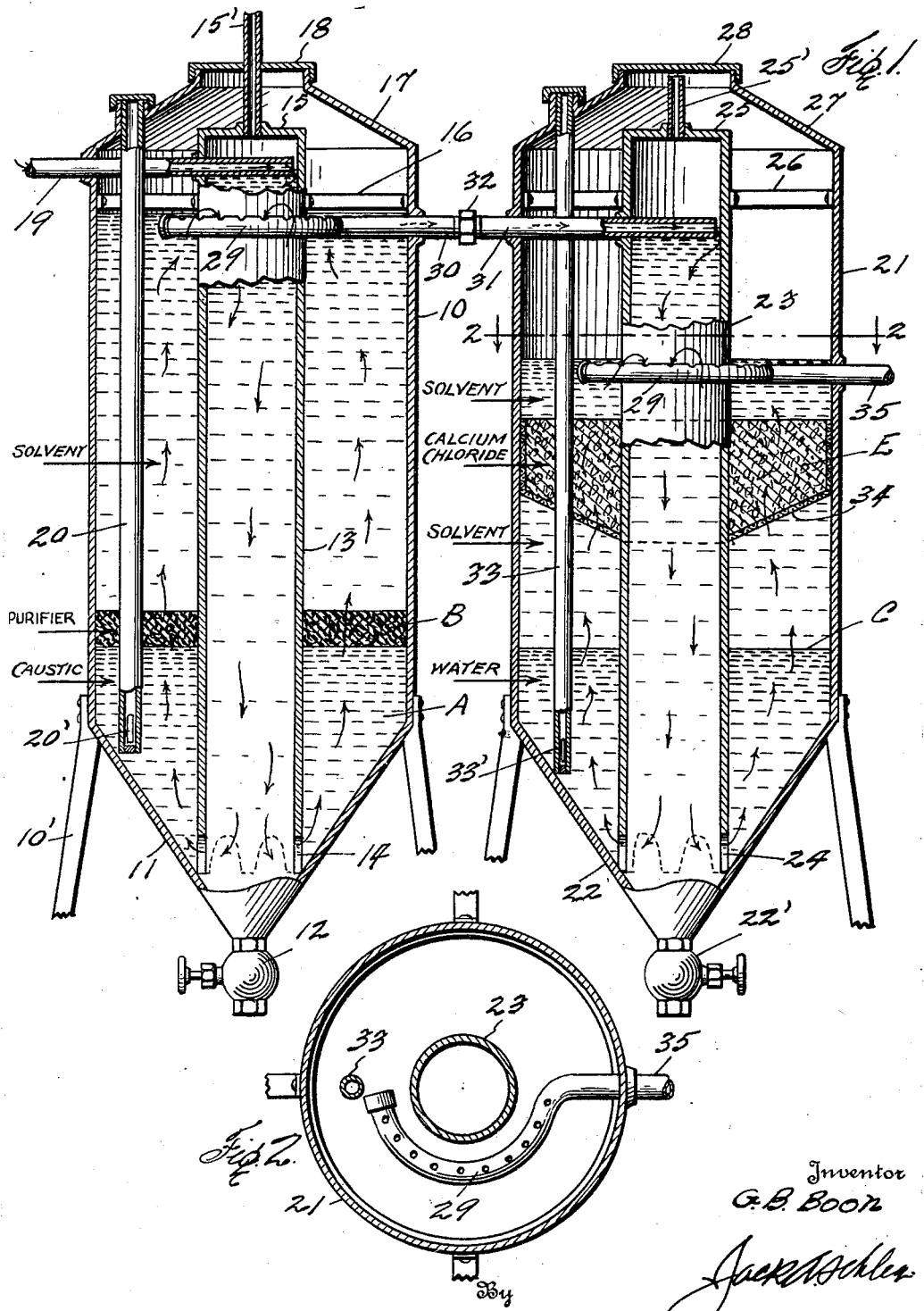

1,866,187

UNITED STATES PATENT OFFICE

GUTHRIE B. BOON, OF AUSTIN, TEXAS, ASSIGNOR TO R. R. STOLLEY, INC.

CLARIFICATION SYSTEM FOR DRY-CLEANING SOLVENTS

Application filed April 27, 1928, Serial No. 273,195. Renewed February 17, 1930.

This invention relates to new and useful improvements in clarification systems.

One object of the invention is to provide an improved clarifying system for purifying detergent liquids, such as gasolene, or other solvents commonly used in dry cleaning establishments and which becomes dirty and must either be filtered and clarified or thrown away.

An important object of the invention is to provide a system which may be installed above ground and also one capable of carrying out the process set forth in my co-pending application filed January 16, 1928, Serial No. 247,021 which resulted in Patent 1,711,829, granted May 7, 1929.

A further object of the invention is to provide containers into which liquids may be flowed so as to practically eliminate agitation, thus preserving the stratification and contiguous relation of ingredients within the said containers.

Another object of the invention is to provide clarification tanks wherein the liquids are introduced and removed from the upper portions of the tanks.

A construction designed to carry out the invention will be hereinafter described, together with other features of the invention.

The invention will be more readily understood from a reading of the following specification and by reference to the accompanying drawing, in which an example of the invention is shown and wherein:

Fig. 1 is a vertical sectional view of a system constructed in accordance with my invention, and Fig. 2 is a horizontal cross-sectional view taken on the line 2—2 of Fig. 1.

In the drawing the numeral 10 designates an upright tank having a conical bottom 11 provided with a suitable drain valve 12. The tank may be supported on legs 10' or otherwise. A comparatively large column or tube 13 is mounted in the center of the tank with its lower end resting upon the conical bottom 11 and notched or otherwise provided with openings 14.

The upper end of the tube is closed by a cap 15 and is supported by braces 16. The tank has a conical top 17 above the tube provided with a lid 18. A vent pipe 15' extends from the cap up through the lid. By removing the lid the tank may be filled or supplied with materials and liquids. A caustic solution A is introduced into the tank and the lower portion filled therewith. A layer or strata B of activated charcoal, or any other cleaning agent suitable for the purpose, is placed on top of the solution.

Dirty gasolene or solvent is pumped or otherwise supplied through a pipe 19 entering the tank just below the top 17. This pipe enters one side of the tube 13 and terminates in close proximity to the opposite wall, whereby the liquid is caused to flow down the inner wall of the tube, thus reducing agitation and splashing.

Owing to the large size of the tube, the solvent will flow from the bottom through the notches 14 in gentle streams and this will avoid stirring up the caustic solution and the sediment in the bottom 11. In order to replenish the caustic solution, a filler pipe 20 extends through the top 17 and down through the layer B to the bottom 11. The lower end of this pipe is closed and outlet slots 20' permit the fresh solution to escape with a minimum agitation.

The solvent escaping through the notches 4, being of less specific gravity than the caustic solution A, will flow upward through said solution and thence through the layer B to the upper portion of the tank. This will cause the dirt and other impurities to settle in the conical bottom and these may be drawn off through the valve 12.

A second tank 21 similar to the tank 10 is provided. This tank 21 has a conical bottom 22, valve 22', central large tube 23, notches 24, cap 25, top 27 and lid 28, all substantially the same as the tank 10; and it may also be supported on legs 21' or otherwise. A vent pipe 25' extends from the cap 25 but terminates short of the lid.

A perforated drain head 29 is curved around the tube 13 of the tank 10 and a pipe 30 extends therefrom and leads through the side wall of the tank. The head is located in the upper portion of the tank just below the pipe 19. A pipe 31 extending into the tank 21 is connected with the pipe 30 by a union 32. The pipe 31 extends across the tube 23 and discharges in close proximity to the opposite inner wall of the tube, thus delivering the fluid without agitation.

The drain head 29 being in the top portion of the tank 10 will maintain a level of solvent flush with its perforations. This arrangement provides a goodly body of solvent in the tank so that streams of solvent flowing upward through the layer B are given time to settle before entering said head.

Water is introduced into the tank 21 through a vertical supply pipe 33 similar to the pipe 20 and which has discharge slots 33' at its closed bottom. The tank is filled with water or liquid suitable for the purpose to the line C. About mid-height of the tank and above the water level, a screen basket 34 is secured in the tank 21 and surrounds the tube. Above the basket and in the upper portion of the tank is mounted a perforated drain head 34 curved around the tube and having a discharge pipe 35 leading out through the side wall of the tank. The head 34 is at a lower level than the head 29.

The solvent discharged by the pipe 31 flows down the tube 23 and escapes through the notches 24 into the bottom 22 of the tank 21. Upon passing upward through the water, the solvent is given a bath or rinse. The solvent will, of course, float on the water and upon passing upward it comes in contact with calcium chloride crystals E contained in the basket 34. This material will extract the water from the solvent and will also remove the traces of lye and other impurities from the solvent. After passing through the basket, the purified and clarified solvent is drained off through the head 34 and pipe 35, from which it may be conducted to its place of use.

It will be seen that the moisture absorbed by the calcium chloride will drain back into the water below and will tend to neutralize any caustic alkali passing through said water. Periodically, the valves 12 and 22' may be opened to drain off undesirable matter. It is possible to carry out this process by different structures and the particular arrangement described is not essential to the process. By the calcium chloride treatment, which removes lye traces and absorbs water, it is possible to hasten the clarifying process and it is not necessary to pass the discharge from the pipe 35 through a filter.

Various changes in the size and shape of the different parts, as well as modifications and alterations, may be made within the scope of the appended claims.

What I claim, is:

1. In a clarifying system for dry cleaning solvents, a tank having a chamber at its lower portion adapted to contain a liquid, a vertical gravity feed tube supported in the tank with its lower end in said chamber disposed to discharge toward the tank wall, a supply pipe of substantially less diameter than the tube extending into the upper portion thereof, and a discharge pipe from the upper portion of the tank.

2. A tank as defined by claim 1, in which the upper end of the tube is closed and provided with a vent to atmosphere.

3. A tank as defined by claim 1, in which the supply pipe discharges against the inner face of the tube wall.

4. A tank as defined by claim 1, in which the discharge pipe is provided with a head extending into the upper portion of the tank.

5. A tank as defined by claim 1, in which a second supply pipe extends downward from the cover of the tank into the liquid chamber thereof.

6. In a clarifying system for dry cleaning solvents, a rinsing tank having a chamber at its base adapted to contain a liquid, a feed pipe at the upper portion of the tank, a gravity feed tube into which said pipe discharges and of greater diameter than the pipe, said tube discharging at the base of said chamber, a reticulated container surrounding the tube above said chamber and adapted to receive a dehydrating and neutralizing body through which the washed solvent passes, and a discharge pipe at the upper portion of said rinsing tank.

7. The construction defined by claim 6, in combination with a second supply pipe extending downward from the cover and through the container to discharge into the chamber.

8. The construction defined by claim 6, in which the liquid chamber of the rinsing tank is of conical configuration surrounding the discharge from the feed tube.

9. The construction defined by claim 6, in which the discharge from the clarifying tank is against a wall of the feed tube of the rinsing tank, and said tube is provided with a vent at its upper end.

10. In a clarifying system for dry cleaning solvents, a rinsing tank having a conical chamber at its base adapted to contain a liquid, a central gravity feed tube supported by said base in spaced relation thereto at its open lower end, a feed pipe of less diameter than said tube discharging toward the upper portion of the wall thereof, means between the tube and tank for supporting solid material above said chamber, and a discharge from the rinsing tank above said supporting means.

11. An apparatus of the character described including a tank having a downwardly tapered end, a tubular conductor extending downwardly and concentrically disposed in said tank to discharge against said tapered lower end, means to circulate a solvent liquid through said apparatus including an inlet and an outlet, said conductor being of a diameter whereby the liquid will flow therethrough substantially slower than the rate at which it enters said tube.

12. In a clarifying system for dry cleaning solvents, a tank adapted to contain liquid, a straight vertical tube supported in said tank and open at its lower end to discharge into the base of said tank, a feed pipe of less diameter than said tube discharging into the upper end thereof, and an outlet from said tank.

13. In a clarifying system an inlet, a tank wherein a fluid is subjected to engagement with a cleansing solution disposed adjacent the base of said tank, a tube concentrically arranged in said tank to form an annular chamber to discharge adjacent the base of said tank and below the surface of the cleansing solution, said tube being of a diameter such that the flow therethrough will be less than the rate of flow of the incoming fluid but greater than the rate of flow in the annular chamber formed by said tube and said tank, whereby the velocity of the fluid discharged from said tube into said tank does not turbulate the cleansing solution, and an outlet from said tank.

14. An apparatus of the character described including a tank, a tubular conductor extending downwardly and concentrically disposed in said tank to discharge against the lower end of said tank, means to circulate solvent liquid through said apparatus, said conductor being of a diameter whereby the liquid will flow therethrough substantially slower than the rate at which it enters said conductor.

15. In an apparatus of the character described including a tank, a gravity flow feed inlet adjacent the top thereof, an unobstructed vertical tube in said tank connected to said inlet to conduct the fluid to a point adjacent the base of said tank, said tube being of a diameter greater than said inlet so that the gravity flow discharge therefrom will be slow as compared to the inlet, and a discharge pipe from said tank of a capacity substantially less than that of said tube.

16. In a clarifying system for dry cleaning a solvent, a tank adapted to contain a cleansing solution in the base thereof, an inlet pipe for the solvent, means connected to said pipe to receive a quantity of solvent therefrom, said means being of greater capacity than said feed pipe whereby the solvent will be introduced below the level of the cleansing solution at a velocity which will not displace the solution, and an outlet for said tank.

In testimony whereof I affix my signature.

GUTHRIE B. BOON.